United States Patent [19]
Browning et al.

[11] Patent Number: 5,152,720
[45] Date of Patent: Oct. 6, 1992

[54] BICYCLE TRANSMISSION

[75] Inventors: Bruce W. Browning; Marc S. Browning, both of Seattle, Wash.

[73] Assignee: Browning Automatic Transmission, Bainbridge Island, Wash.

[21] Appl. No.: 762,151

[22] Filed: Sep. 23, 1991

Related U.S. Application Data

[63] Continuation-in-part of Ser. No. 587,401, Sep. 24, 1990, Pat. No. 5,073,152.

[51] Int. Cl.⁵ .............................................. F16H 9/00
[52] U.S. Cl. ...................................................... 474/80
[58] Field of Search ................................. 474/78–81, 474/162; 280/236

[56] References Cited

U.S. PATENT DOCUMENTS

| | | | |
|---|---|---|---|
| 3,890,847 | 6/1975 | Dian | 74/217 B |
| 3,919,891 | 11/1975 | Stuhlmuller et al. | 74/217 B |
| 4,041,788 | 8/1977 | Nininger, Jr. | 74/217 B |
| 4,127,038 | 11/1978 | Browning | 74/217 B |
| 4,580,997 | 4/1986 | Browning et al. | 474/78 |
| 4,605,240 | 8/1986 | Clem et al. | 280/236 |
| 4,617,006 | 10/1986 | Nagano | 474/80 |
| 4,619,632 | 10/1986 | Nagano | 474/80 |
| 4,756,704 | 7/1988 | Nagano | 474/144 |
| 4,758,205 | 7/1988 | Durham . | |
| 4,838,837 | 6/1989 | Testa | 474/80 |
| 4,842,568 | 6/1989 | Marchigiano | 474/80 |
| 4,894,046 | 1/1990 | Browning | 474/78 |
| 4,919,644 | 4/1990 | Carlyle . | |

FOREIGN PATENT DOCUMENTS

| | | |
|---|---|---|
| 134214 | 11/1901 | Fed. Rep. of Germany . |
| 908832 | 4/1954 | Fed. Rep. of Germany . |
| 3118035 | 5/1981 | Fed. Rep. of Germany . |
| 2543639 | 4/1983 | France . |

Primary Examiner—Thuy M. Bui
Attorney, Agent, or Firm—Seed and Berry

[57] ABSTRACT

A bicycle transmission comprises a sprocket assembly rotatably coupled to the frame of a bicycle for receiving a chain, a front and rear sprocket selector for causing the sprocket assembly to shift the chain from one sprocket to another, a sliding bracket for retractably mounting the sprocket selector to the bicycle frame, adjustment brackets for finely adjusting the front and rear sprocket selectors to correspond to the path of the sprocket assembly, and a compensator for engaging and following the chain as it is shifted between sprockets to eliminate any free chain between the compensator and the sprocket and for reentraining the chain in the event of complete derailment. In addition, the bicycle transmission may include a sprocket assembly comprising a stationary sector, a swinging sector hingedly coupled to the stationary sector, and a plurality of load bearing surfaces extending radially outwardly of the stationary sector for taking the load from the swinging sector.

16 Claims, 11 Drawing Sheets

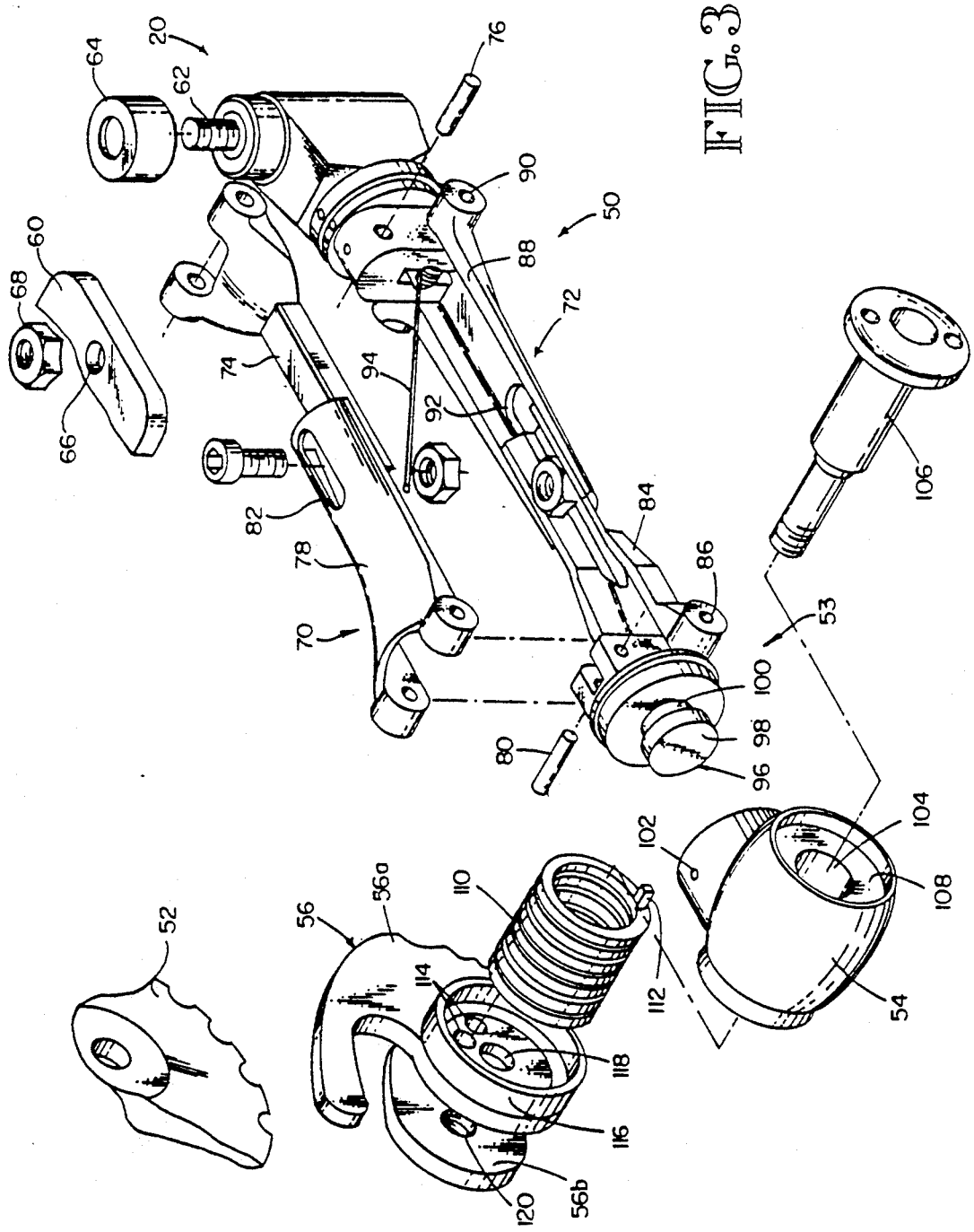

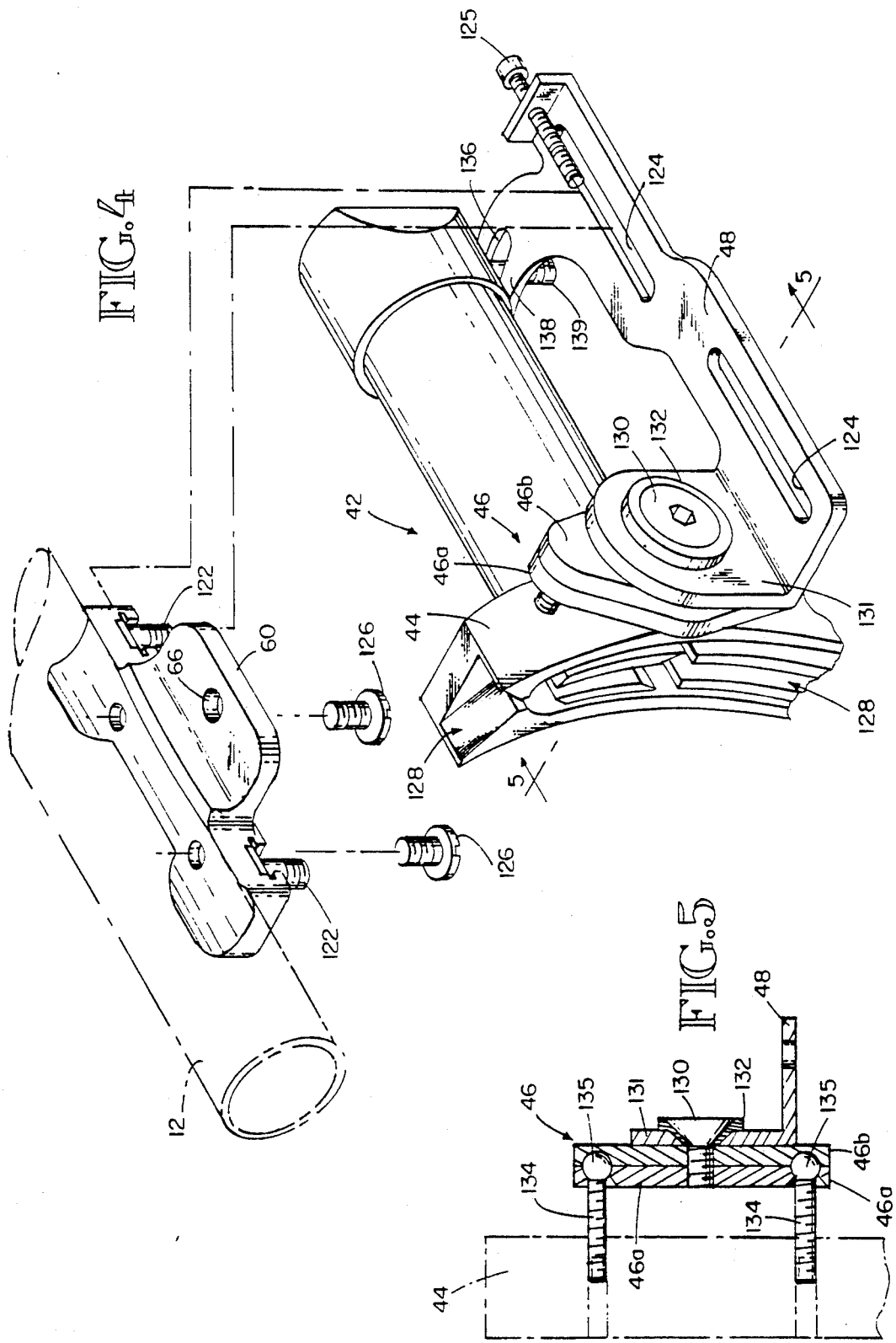

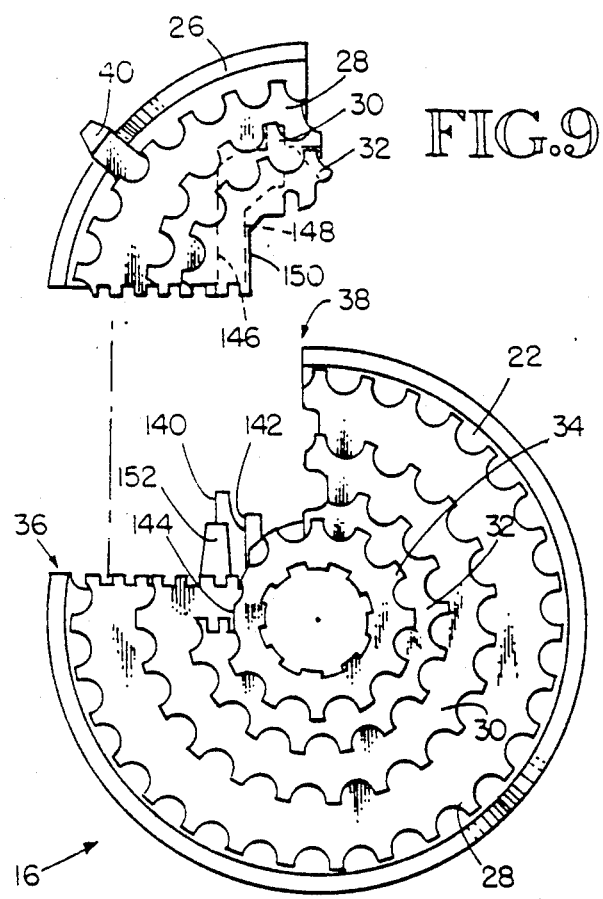
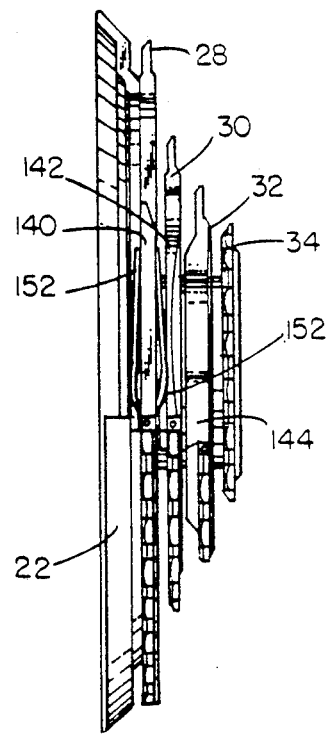
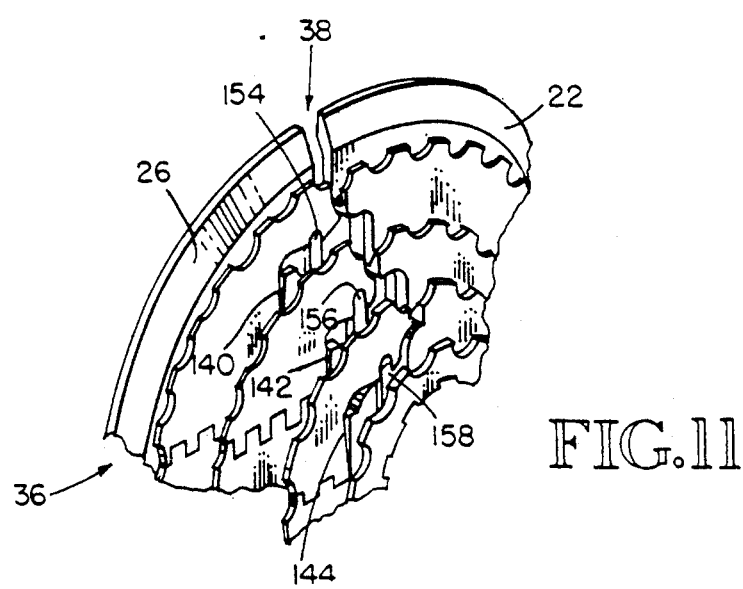

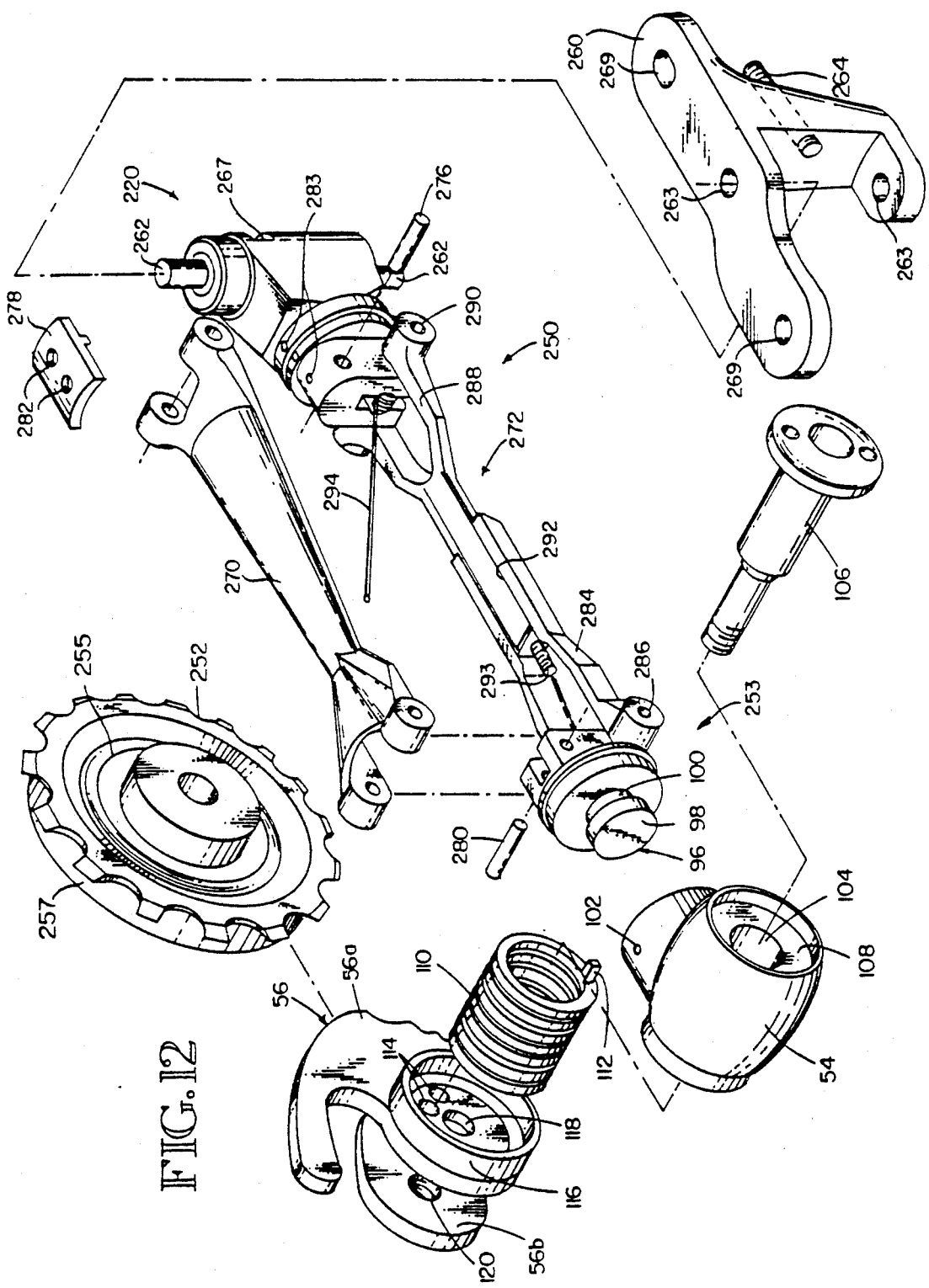

BICYCLE TRANSMISSION

RELATED APPLICATION

This is a continuation-in-part of pending U.S. patent application Ser. No. 07/587,401, Now Pat. No. 5,073,152.

TECHNICAL FIELD

This invention relates to bicycle transmissions, and more particularly, to a bicycle shifting mechanism capable of shifting the chain between sprockets while the sprocket is under a force of a relatively high magnitude.

BACKGROUND OF THE INVENTION

The need in cycling for efficient, fast shifting from a sprocket of one diameter to another has long been recognized. The vast majority of shifting methods involve a standard derailleur which forces the chain on the holding sprocket toward an adjacent or receiving sprocket until a cog of the adjacent sprocket catches the chain, which causes the chain to become entrained around the sprocket.

These prior derailleurs have proven deficient, however, in that they are incapable of maintaining a positive drive connection throughout the full shifting process. That is, the chain must bridge the gap between the two sprockets while being shifted and thus a full, effective sprocket diameter cannot be maintained. Under normal operating conditions, derailleur shifting mechanisms generally require a reduction in the torque exerted on the sprocket by the chain to allow the chain to jump from one sprocket to another. Therefore, derailleur shifting mechanisms are incapable of shifting the chain to a different sprocket when a force of a relatively high magnitude is being applied to the sprocket.

U.S. Pat. No. 4,127,038 discloses a sprocket assembly having a hinged swinging sector that pivots relative to a stationary sector to align the holding sprocket with the receiving sprocket. The chain is picked up immediately by the receiving sprocket without having to first cross a gap between the holding and receiving sprockets. This type of sprocket assembly effectively provides a full sprocket diameter for the chain to engage throughout the shifting process before the swinging sector pivots back to its normal position.

U.S. Pat. Nos. 4,580,997 and 4,894,046 disclose sprocket selector devices used in conjunction with sprocket assemblies such as the one shown in U.S. Pat. No. 4,127,038. A pawl extending outwardly of the swinging sector passes through a control unit as the sprocket assembly is rotates with the wheel. To shift the chain from one sprocket to another, the control unit deflects the pawl and attached swinging sector in the direction of the receiving sprocket on the stationary sector so that the holding sprocket of the swinging sector becomes aligned with the receiving sprocket and remains in the deflected position until the chain is shifted.

These sprocket shifting assemblies do not involve forcing the chain diagonally across the gap between the holding sprocket and the receiving sprocket, as is done when standard derailleurs are used. A major advantage of the above-mentioned sprocket shifting assemblies is that the rider can shift the chain from one sprocket to another while the sprocket assembly is under a torque of a relatively high magnitude. Another advantage of these sprocket shifting assemblies is that pivoting of the swinging sector (and thus shifting the chain from one sprocket to another) requires a minimal amount of energy.

A few problems have developed, however, in using the above-mentioned sprocket assemblies. First, the close proximity of the control unit to the sprocket assembly creates problems in removing the wheel and rear sprocket assembly from the bicycle frame. The control unit must be mounted on the bicycle frame close enough to the sprocket assembly to ensure that the pawl passes through the control unit. Traditionally, removal of the wheel and sprocket assembly has required complete removal of the control unit from the bicycle frame to allow clearance for the wheel and sprocket assembly.

Second, the control unit or sprocket selector for both the front and rear sprocket assemblies must be finely adjusted to accept the pawl without interference in the absence of shifting. The fine adjustments have traditionally been difficult to make because previous mounting arrangements have required that adjustments be made before the control unit is coupled to the bicycle frame. Therefore, if the person adjusting the control unit guesses wrong, or if the control unit cannot be mounted in exactly the same position with respect to the sprocket assembly after each time it has been removed, the adjustment process becomes a burdensome trial-and-error process.

Third, because these sprocket assemblies involve multiple movable parts, determining how to distribute the forces among the various parts of the sprocket assembly has been difficult. Since the generally V-shaped swinging sector pivots about a hinged side relative to the stationary sector, the most displacement of the swinging sector occurs at the periphery of the sprocket assembly. If the load is to be taken by the stationary sector at the parting side, as compared to the hinged side, the periphery of the swinging sector at the parting side would have to be at least as thick as the most extreme position of the periphery of the stationary sector. Of course, any additional thickness of the sprocket assembly adds weight to the bicycle and makes the sprocket assembly more difficult to manufacture.

In addition, because the foregoing sprocket assemblies are shifted by a means other than a derailleur, there is a need for a device capable of maintaining the tension in the chain when the chain is shifted between the sprockets. There is also a need for a device capable of maintaining as much of the chain as possible entrained around the sprocket at all times.

Attempts have previously been made to keep the chain tensioned and entrained around the sprocket assembly by coupling a flexible rod, similar to a fishing rod, at one end to the frame of the bicycle and rotatably coupling a jockey wheel to the opposite end to engage the lower side of the chain loop and force the chain up into engagement with the bottom portion of the sprocket. This arrangement proved unsuccessful, however, because the rod would bounce excessively under normal operating conditions which would create slack in the chain and cause the chain to separate from the sprocket.

SUMMARY OF THE INVENTION

It is therefore a primary object of the invention to provide a sprocket assembly wherein the chain can be shifted between sprockets while the sprocket assembly is under a torque of a relatively high magnitude.

Another object of the invention to provide a device for maintaining as much of the chain entrained around the holding sprocket as possible.

Another object of the invention is to provide a device which takes up slack in the chain as the chain is shifted between sprockets.

Still another object of the invention is to provide a device which follows the chain as it is shifted between sprockets to take up the slack and keep the chain entrained around the holding sprocket, instead of forcing the chain from one sprocket to another.

Another object of the invention is to provide a means for moving the sprocket selector away from the sprocket assembly so that the wheel and sprocket assembly can be removed from the bicycle frame without interference.

Yet another object of the invention is to provide a means for finely adjusting the sprocket selector after the selector has been mounted to the bicycle frame to correspond with the path of the pawl of the sprocket assembly.

Another object of the invention is to provide a sprocket assembly having a structure that allows for the efficient transfer of force from the swinging sector to the stationary sector.

Another object of the invention is to provide a sprocket assembly that is economical to manufacture and is relatively lightweight.

The foregoing objects, as well as other objects that will become apparent from the detailed description below, are achieved by a bicycle transmission comprising a sprocket assembly rotatably coupled to the frame of a bicycle, a chain entrained around a sprocket of the sprocket assembly, a sprocket selector for causing the sprocket assembly to shift the chain from one sprocket to another, a sliding bracket for mounting the sprocket selector to the bicycle frame which allows the selector to be retracted away from the sprocket assembly so the rear wheel and sprocket assembly can be removed from the bicycle frame, an adjustment bracket for finely adjusting the sprocket selector to correspond to the path of the pawl coupled to each sprocket assembly, and a compensator for following the chain as it is shifted between sprockets to take up slack in the chain and maintain as much of the chain as possible entrained around the sprocket.

The sprocket assembly of the present invention comprises a stationary sector defining a generally V-shaped opening coupled to a bicycle axle and a corresponding V-shaped swinging sector hingedly coupled to the stationary sector at a hinged side of the V-shaped opening. A plurality of load bearing flanges extend radially outwardly of the stationary sector within the V-shaped opening to take the load imparted from the chain to the swinging sector.

BRIEF DESCRIPTION OF THE DRAWINGS

FIG. 3 is an exploded isometric view of the compensator portion of the sprocket shifting assembly;

FIG. 4 is an exploded isometric view of the sprocket selector for the rear sprocket assembly, including the corresponding double-plated adjustment bracket, sliding bracket, and mounting bracket;

FIG. 5 is a cross-sectional side view taken along the line 5—5 of FIG. 4 of the double-plated adjustment bracket;

FIG. 9 is an exploded side elevational view of the inventive sprocket assembly showing the swinging sector separated from the stationary sector, exposing the load-bearing surfaces;

FIG. 10 is an end elevational view of the stationary sector of the inventive sprocket assembly;

FIG. 11 is a partial isometric view of the inventive sprocket assembly showing the swinging sector pivoted relative to the stationary sector;

FIG. 12 is an enlarged isometric view of an alternative embodiment of the compensator, the jockey wheel, and the compensator mounting bracket of the present invention;

DETAILED DESCRIPTION OF THE INVENTION

Figure 1:
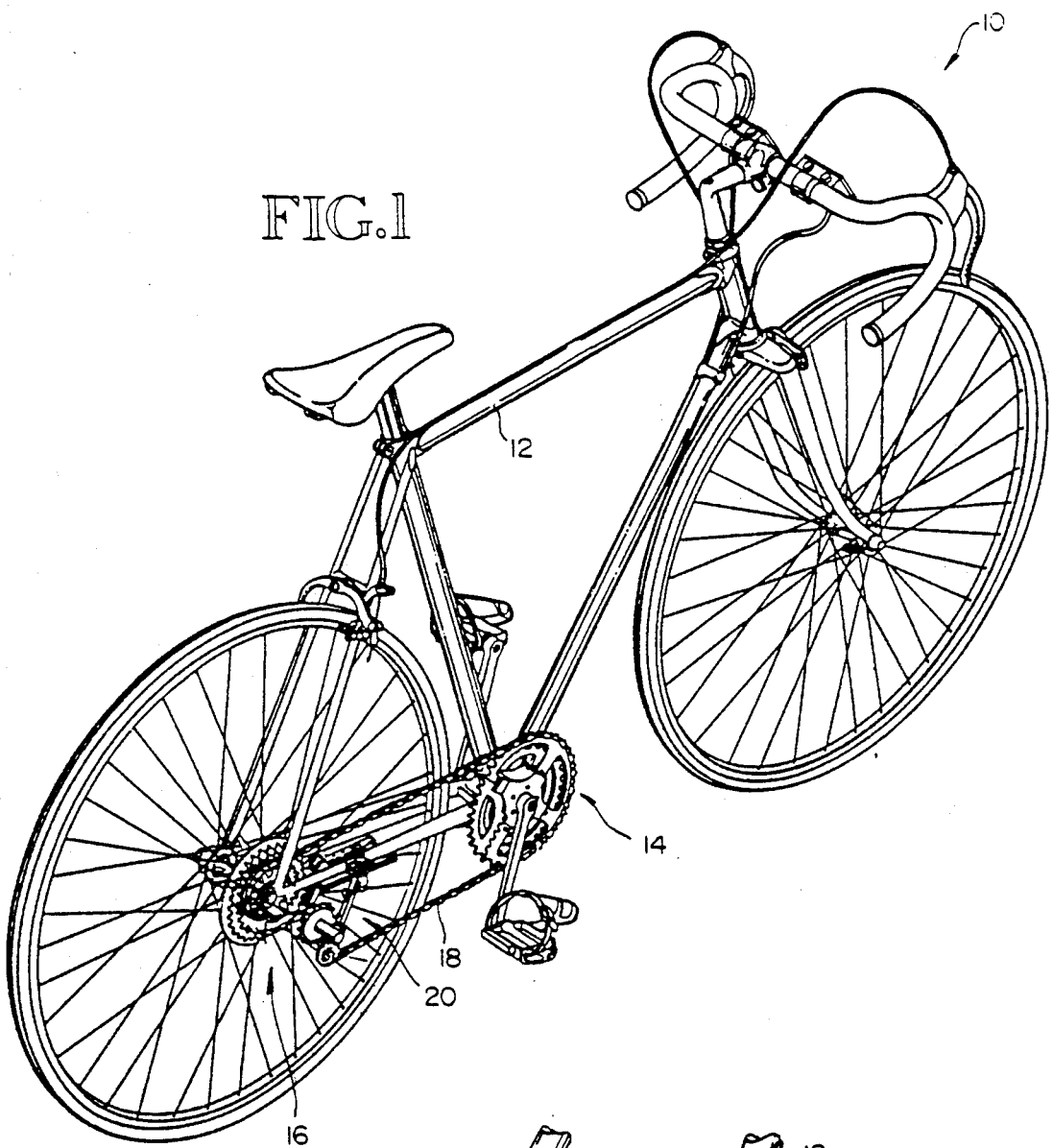
FIG. 1 is an isometric view of a bicycle including the transmission of the present invention.

With reference to FIG. 1, the present invention is generally intended for a bicycle 10 which includes a frame 12, a front sprocket assembly 14, a rear sprocket assembly 16, and a chain 18 entrained around both the front sprocket assembly 14 and the rear sprocket assembly 16. A compensator 20 is coupled to the frame 12 at one end and entrained by the chain 18 at the opposite end to take up slack in the chain 18 that may result when the chain is shifted between the sprockets of the rear sprocket assembly 16. The compensator 20 also urges the chain 18 in an upward direction to maintain as much of the chain as possible entrained around the sprocket holding the chain. The bicycle transmission of the present invention is intended for use with all types of cycles, regardless of the number of wheels involved, and for use with all kinds of bicycles, including street bicycles, mountain bicycles, racing bicycles, and any other type of bicycle.

Figure 2:
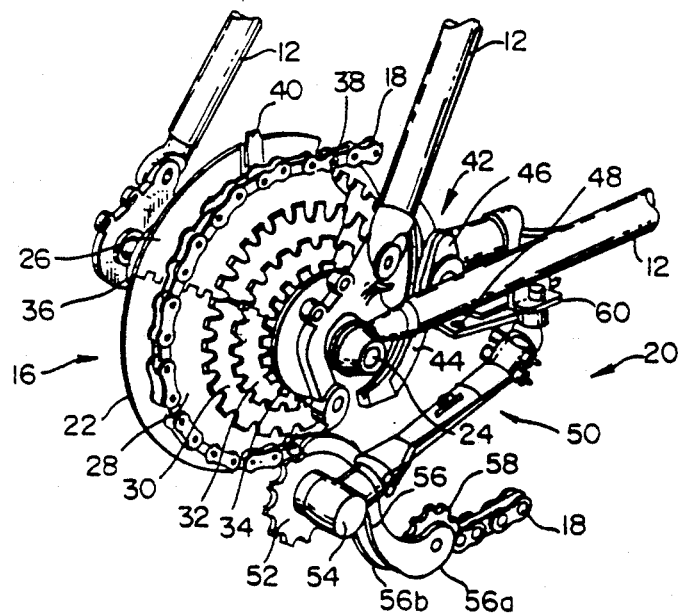
FIG. 2 is an enlarged isometric view of the sprocket shifting assembly of the present invention, including the compensator, adjustment bracket, and sliding bracket.

FIG. 2 shows a preferred embodiment of the rear sprocket assembly 16, including the compensator 20, a rear sprocket selector 42, a double-plated adjustment bracket 46, a sliding bracket 48, and a mounting bracket 60. The rear sprocket assembly 16 comprises a stationary sector 22 coupled to the rear axle 24 of the bicycle 10, and a swinging sector 26 hingedly coupled to the stationary sector 22. Both the stationary sector 22 and the swinging sector 26 include a plurality of sprockets, including a large, outer sprocket 28, a first middle sprocket 30, a second middle sprocket 32, and an inner sprocket 34. When the chain 18 is not being shifted between sprockets, the stationary sector 22 and the swinging sector 26 remain aligned so that each of the sprockets has a 360° outside diameter which lies in a single plane. While the embodiment of FIG. 2 shows four sprockets of varying diameters, it is understood that the invention is equally suitable for sprocket assemblies having more or fewer sprockets.

The stationary sector 22 defines a generally V-shaped open area into which a corresponding V-shaped swinging sector 26 is mounted. The V-shaped opening, shown in greater detail in FIGS. 9-11, is defined by a hinged side 36 and a parting side 38 of the stationary sector 22. A pawl 40 extends radially outward from the outer sprocket 28 of the swinging sector 26. The pawl 40 travels in a circular path and is deflected in a direction transverse to the planes of the sprockets to pivot the swinging sector 26 relative to the stationary sector 22 in order to shift the chain 18 from a holding sprocket to a receiving sprocket.

As shown in FIG. 2, the sprocket selector 42 is mounted to the bicycle frame 12 in close proximity to the rear sprocket assembly 16 to cause the chain to shift from one sprocket to another. The sprocket selector includes an arc-shaped pawl guide housing 44, the arc of which corresponds to the circular path of the pawl 40. The pawl guide housing 44 must be positioned close enough to the sprocket assembly 16 to allow the pawl 40 to pass through the pawl guide housing 44, yet the housing 44 cannot be mounted so close that it interferes with the rotation of the sprocket assembly 16. The sprocket selector 42 is coupled to the frame 12 by way of a double-plated adjustment bracket 46 which finely adjusts the position of the pawl guide housing 44. The adjustment bracket 46 is coupled to the sliding bracket 48, which is in turn mounted to the bicycle frame 12. Each of the above-mentioned elements shown in FIG. 2 will be discussed later in greater detail.

The compensator 20 generally comprises an articulated arm 50 having a proximal and distal end, the proximal end being pivotally coupled to the sliding bracket 48, and a tensioning arm 56 pivotally connected to the distal end of the articulated arm 50. A jockey wheel 52 is also coupled to the distal end of the articulated arm 50 to engage the chain 18 and maintain as much of the chain 18 entrained around the particular sprocket as possible. The tensioning arm 56 is coupled to the distal end of the articulated arm 50 adjacent the jockey wheel 52 and a spring housing 54. A tensioning wheel 58 is rotatably coupled to the end of the tensioning arm 56 opposite the articulated arm 50. The spring housing 54 encloses a means for biasing the tensioning arm 56 away from the articulated arm 50 and for biasing the compensator 20 as a whole in an upward direction so that the compensator 20 follows the chain 18 and takes up any slack created by shifting the chain 18 between sprockets.

With reference to FIG. 3, one embodiment of the compensator 20 is shown in an exploded isometric view. The articulated arm 50 of the compensator 20 is mounted to the bicycle frame 12 (FIG. 1) by means of a mounting bracket 60. A vertical pin 62 having a threaded end extends upwardly of the proximal side of the articulated arm 50. A dust cover 64 is inserted over the vertical pin 62 which allows the articulated arm 50 to pivot freely in a horizontal plane. The end of the pin in inserted through an aperture 66 defined by the mounting bracket 60 and secured in place with a threaded nut 68.

An upper parallelogram linkage 70 and a lower parallelogram linkage 72 are coupled to the proximal end of the articulated arm 50 to maintain the jockey wheel 52 parallel to the planes of the sprockets and allow the jockey wheel 52 to follow the chain 18 from sprocket to sprocket. The upper parallelogram linkage 70 comprises an upper base arm 74 hingedly coupled to the proximal end of the articulated arm 50 by a pin 76, and an upper extension arm 78 hingedly coupled to the distal end of the articulated arm 50 by a pin 80. The upper extension arm 78 defines an elongated slot 82 which allows the extension arm 78 to move relative to the upper base arm 74 to change the length of the upper parallelogram linkage 70 as needed to properly position the jockey wheel 52 in place against a given sprocket. The upper base arm 74 and the upper extension arm 78 are coupled together by a nut and bolt arrangement as shown in FIG. 3.

The lower parallelogram linkage 72 is assembled essentially the same as the upper parallelogram linkage 70. A lower base arm 84 is hingedly coupled to the distal end of the articulated arm 50 by means of a pin 86. The lower extension arm 88 is hingedly coupled to the proximal end of the articulated arm 50 by way of a pin 90. Similar to the upper parallelogram linkage, the lower extension arm 88 includes an elongated slot 92 which allows the lower extension arm 88 to move relative to the lower base arm 84 so the lower parallelogram linkage 72 can be adjusted to an appropriate length. The lower base arm 84 is coupled to the lower extension arm also by a nut-and-bolt connection through the slot 92, as shown in FIG. 3. Although the foregoing describes a preferred embodiment of the articulated arm 50, it is to be understood that the specific manner of constructing and assembling articulated arm 50, including the parallelogram linkage, could vary according to what is known by persons skilled in the art.

A lever spring 94 is rotatably coupled to the pin 90 of the lower extension arm 88 in such a way that the lever spring 94 extends between the upper parallelogram linkage 70 and the lower parallelogram linkage 72. The lever spring 94 biases the parallelogram linkage upwardly to urge the jockey wheel 52 into engagement with the chain 18 and acts in conjunction with the parallelogram linkage to maintain the jockey wheel 52 parallel to the planes of the sprockets. Use of the lever spring 94 is, however, optional and is not an absolute requirement to carry out the present invention.

A cylindrical button connection 96 having an enlarged circular head 98 and a circumferential slot 100 is integrally formed on the distal end of the articulated arm 50. The coil spring housing 54 is inserted over the button connection 96 and set screws 102 may be tightened into the circumferential slot 100 to securely couple the spring housing 54 to the articulated arm 50. A similar type of connection may be used at the proximal end of the articulated arm 50. It should be noted that the button connection 96 is but one method of connecting the spring housing 54 to the articulated arm 50, and that other means for securing the housing 54, such as welding or other permanent coupling means, could be used.

The spring housing 54 defines a small, cylindrical aperture 104 through which a connecting bolt 106 may be inserted to secure the tensioning arm 56 to the distal end of the articulated arm 50. The spring housing 54 also defines a larger aperture (not shown) having a bottom 108 into which a coil spring 110 is inserted. The coil spring 110 has oppositely-extending ends 112 which may be inserted into alternative cavities 114 to prevent the coil spring 110 from rotating relative to the spring housing when the compensator 20 is in operation. The coil spring 110 is the primary and may be the only means for providing an upward bias to the compensator 20. In addition, the coil spring 110 biases the tensioning arm 56 away from the articulated arm 50 in order to maintain tension in the chain 18 and keep the chain 18 entrained around the sprocket.

The tensioning arm 56 includes a dust cover 116 within which an end of the coil spring 110 is housed. The dust cover 116 is placed over one end of the spring housing 54 to keep foreign substances away from the spring. Plate 56a holds the coil spring 110 in place. A portion of the tensioning arm 56 surrounded by the dust cover 116 defines an aperture 118 through which the connecting bolt 106 is inserted to rotatably mount the tensioning arm 56 to the articulated arm 50. The tensioning arm 56 comprises a pair of plates 56a, 56b which extend side-by-side and parallel to one another and are coupled to the articulated arm 50 at one end and provide a means for rotatably mounting a tensioning wheel 58 at the opposite end.

The connecting bolt 106 is inserted through the spring housing 54, the coil spring 110, the plate 56a, the tensioning wheel 58, and into a threaded bore 120 defined by the plate 56b to secure the distal of the articulated arm together.

Figure 6:
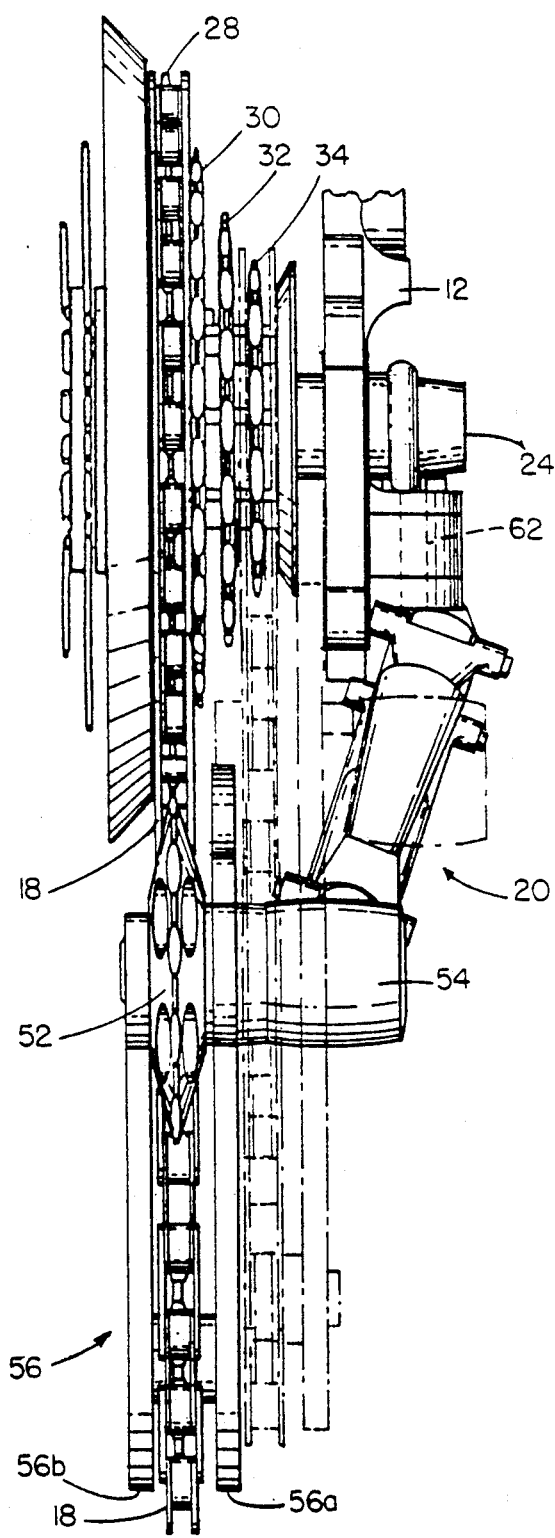
FIG. 6 is an end elevational view of the inventive sprocket shifting assembly including the compensator.

Referring again to FIGS. 1 and 2, as the chain 18 leaves the front sprocket assembly 14 it becomes entrained around the tensioning wheel 58, between the plates 56a, 56b, around the jockey wheel 52, around the sprocket assembly 16, and finally back around the front sprocket assembly 14. Referring now to FIG. 6, the compensator 20 holds the chain 18 firmly against the outer sprocket 28 so that no gap exists between the sprocket, the chain 18, and the jockey wheel 52. That is, there is no lead chain between the jockey wheel 52 and the holding sprocket. The parallelogram linkage and the vertical pin 62 allow the jockey wheel 52 to remain in a plane parallel to the plane of the sprockets at all times. As shown in solid lines in FIG. 6, the jockey wheel 52 lies in the same vertical plane as the outer sprocket 28. When the chain is shifted down to the inner sprocket 34 (shown in phantom) the compensator 20 follows the chain automatically so that the jockey wheel 52 remains continually engaged with the chain 18. The chain 18 itself provides transverse stability to the jocket wheel 52 to keep the chain 18 engaged with the jockey wheel 52. The parallelogram linkage and the vertical pin 62 allow the jockey wheel 52 and the tensioning wheel 58 to remain parallel to the planes of the sprockets when the chain 18 is entrained any of the sprockets, including the small, inner sprocket 34.

Figure 8:
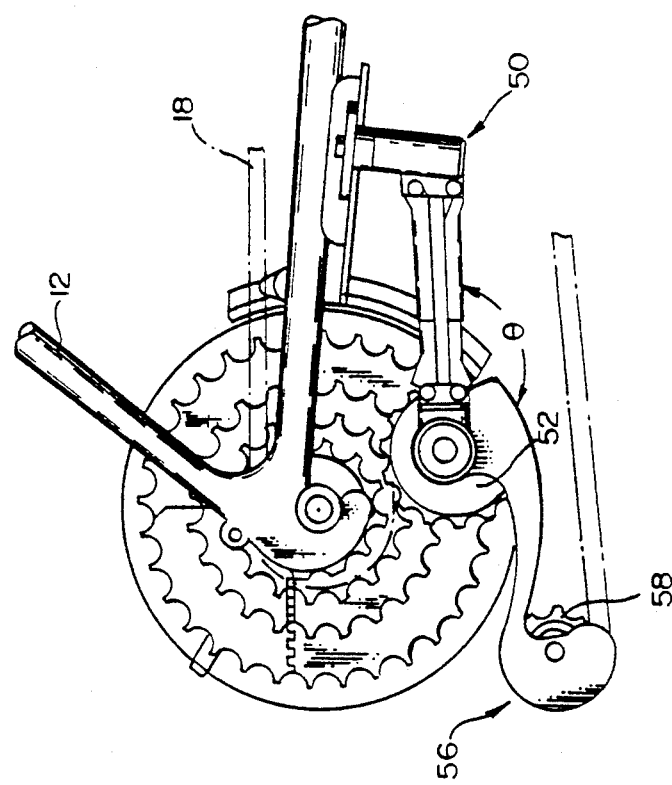
FIG. 8 is a side elevational view of the sprocket shifting assembly with the chain entrained around the second middle sprocket.
Figure 7:
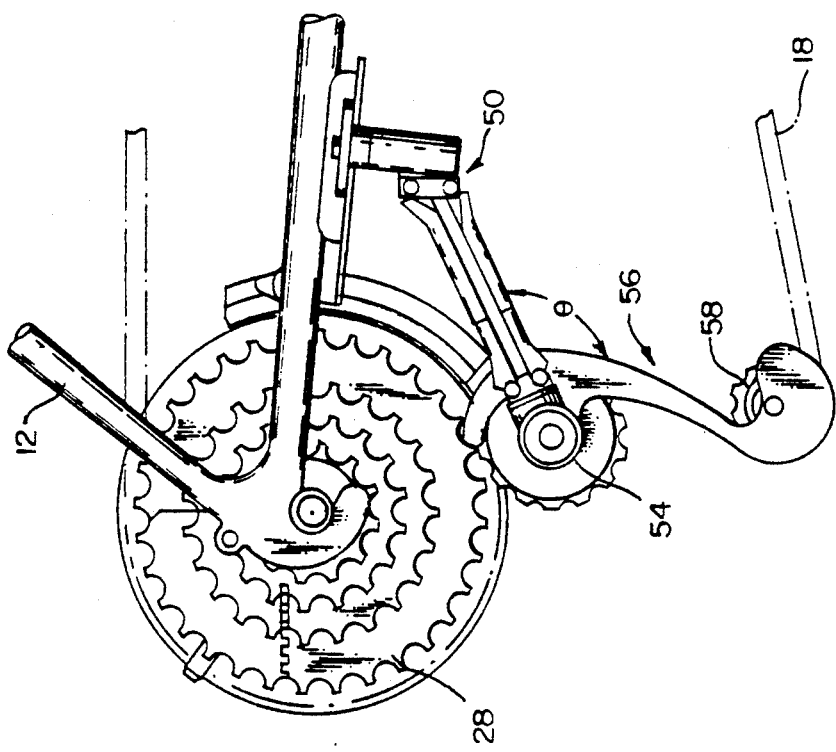
FIG. 7 is a side elevational view of the sprocket shifting assembly with the chain entrained around the outer sprocket.

FIGS. 7 and 8 show how the articulated arm 50 moves relative to the tensioning arm 56 when the chain 18 is shifted from one sprocket to another. FIG. 7 shows the chain 18 (in phantom) entrained around the outer sprocket 28 which takes up more chain and thus causes the tensioning arm 56 to move toward the articulated arm 50 against the bias of the coil spring 110 (not shown) in the spring housing 54 to shorten the distance between the tensioning wheel 58 and the front sprocket assembly 14 (FIG. 1). Therefore, when the chain is entrained around the outer sprocket 28, a small angle ($\theta$) is formed between the articulated arm 50 and the tensioning arm 56.

FIG. 8 shows the chain 18 (in phantom) entrained around the inner sprocket 34. At this position, the coil spring 110 (not shown) within the spring housing 54 causes the tensioning arm 56 to rotate relative to the articulated arm 50 to form a large angle ($\theta$) between the articulated arm 50 and the tensioning arm 56 and take up slack in the chain 18 resulting from shifting from a large diameter sprocket to a small diameter sprocket.

With reference to FIGS. 4 and 5, the mounting bracket 60, which mounts the compensator 20 and sprocket selector 42 to the bicycle frame 12 (shown in phantom), is secured to the bicycle frame 12 by machine screws 126. The mounting bracket 60 also includes a pair of bolts 122 which extend downwardly of the mounting bracket 60 for securing the sliding bracket 48 to the bicycle frame 12. The bolts 122 are inserted through elongated slots 124 of the sliding bracket 48 and secure the bracket 48 to the frame 12 by corresponding nuts (not shown).

The rear sprocket selector 42 is mounted to the bicycle frame 12 by way of the sliding bracket 48. The elongated slots 124 allow the entire sprocket selector 42 to be positioned closely to and retracted away from the path of the pawl 40 and the rear sprocket assembly 16 so that the bicycle wheel and sprocket assembly 16 may be removed from the bicycle frame without interfering with the sprocket selector 42. The sprocket selector 42 must be positioned so that the pawl 40 travels in a circular path through a slot 128 in the pawl-guide housing 44 without interference during normal operation when no shifting takes place. Therefore, fine adjustments to the sprocket selector 42 are commonly required in order for the pawl-guide housing 44 to be properly positioned. A positioning screw 125 may be used to move the sliding bracket 48 relative to the mounting bracket 60 upon initial installation. Thereafter, the positioning screw 125 acts as a reference point when the sliding bracket 48 is retracted and later repositioned.

The double-plated adjustment bracket 46 is provided to align the pawl guide housing 44 to allow the pawl 40 to pass through the slot 128 without interference. A pair of plates 46a, 46b are coupled together by an allen-head machine screw 130 which is inserted through a vertical extension 131 of the sliding bracket 48 and threadably received by the plate 46a. A resilient washer 132 is placed between the screw 130 and the vertical extension 131 to ensure that the allen-head machine screw 130 remains tightened.

As shown in FIG. 5, the double-plated adjustment bracket 46 encases spherical heads 135 of adjustment screws 134 having ends which are threadably received by the pawl guide housing 44. The spherical heads 135 allow the adjustment screws 134 to rotate within the adjustment bracket 46 while the treaded ends adjust the position of the pawl guide housing 44. The principal advantage of the adjustment bracket 46 is that the pawl-guide housing 44 can be finely adjusted after the sprocket selector 42 has been coupled to the bicycle frame 12.

The sprocket selector 42 also includes a vertical screw 139 which rides in a slot 136 defined by a horizontal extension 138 of the sliding bracket 48 for adjusting the position of the pawl guide housing 44. Once the proper position is achieved, the vertical screw 139 is secured in the slot 136 by a corresponding nut (not shown).

With reference to FIGS. 9–11, the present invention also involves a plurality of flanges with load-bearing surfaces 140, 142, 144 extending from the stationary section 22 of the sprocket assembly 16 for transmitting the load of the swinging sector 26 imparted by the chain 18 to the stationary sector 22. With reference to FIG. 9, the stationary sector 22 defines a generally V-shaped opening bounded by a hinged side 36 and a parting side 38.

Within the area of the V-shaped opening, a load-bearing surface extends outwardly from the stationary sector 22 for each sprocket: an outer load-bearing surface 140 which corresponds to the outer sprocket 28, a first middle load-bearing surface 142 which corresponds to the first middle sprocket 30, and a second middle load-bearing surface 144 which corresponds to the second middle sprocket 32. The inner sprocket 34 does not require a load-bearing surface, since the inner sprocket 34 comprises a continuous 360° ring.

As shown in FIG. 9, the swinging sector 26 provides an outer engagement face 146 which corresponds to the outer load-bearing surface 140, a first middle engagement face 148 which corresponds to the first middle load-bearing surface 142, and a second middle engagement face 150 which corresponds to the second middle load-bearing surface 144.

Each of the load bearing surfaces 140, 142, 144 extends parallel to the plane of the parting side 38. Because the load bearing surfaces 140, 142, 144 are relatively short in radial length, and therefore provide short moment arms, they do not have to be unnecessarily thick to withstand the magnitude of torque imparted by the chain 18 to the swinging sector 26. The load bearing surfaces 140, 142, 144 generally take most of the load of the swinging sector 26, relieving the load on the hinged side 36 and the parting side 38.

With reference to FIG. 10, a spring clip 152 is coupled to both sides of the stationary sector 22 for engaging a portion of the swinging sector 26 so that after the swinging sector 26 has caused the chain 18 to shift to a different sprocket, the swinging sector 26 automatically returns to its normal position in alignment with the stationary sector 22. FIG. 11 shows link members 154, 156, 158 pivotally connecting the sprockets of the swinging sector 26. The link members 154, 156, 158 maintain the spacing between the sprockets and limit the range of movement of the swinging sector 26 about hinged side 36.

The location of the load-bearing surfaces 140, 142, 144 as shown in FIGS. 9–11 allows the stationary sector 22 to take the load imparted by the chain 18 onto the swinging sector 26, rather than the load being taken at hinged side 36 or the parting side 38 of the swinging sector 26. If the load-bearing surfaces were located at the parting side 38 of the stationary sector 22, the width of the swinging sector 26 at its periphery would have to be as wide as the full range of articulation required for a shift from a smaller to a larger sprocket. The shift from a larger to smaller sprocket puts no load on the hinge. Therefore, because the load-bearing surfaces are located close to the center axis of the stationary sector 22, the sprockets can be manufactured in a single width, which is cheaper than manufacturing sprockets with a peripheral thickness to correspond to the full range of articulation of the swinging sector 26.

FIG. 12 shows an exploded perspective view of an alternative embodiment of a compensator 220. An articulated arm 250 of the compensator 220 is mounted to a bicycle frame 12 (not shown) by means of a compensator mounting bracket 260. A vertical pivot pin 262 extends vertically through the top and bottom of the proximal side of the articulated arm 250 and is received by apertures 263 of the mounting bracket 260. The pivot pin 262 allows the articulated arm 250 to pivot in a horizontal direction. The compensator mounting bracket 260 is secured to the frame 12 through apertures 269.

An upper parallelogram linkage member 270 and a lower parallelogram linkage assembly 272 are coupled to the proximal end of the articulated arm 250 and serve to maintain a jockey wheel 252 aligned in a parallel orientation with respect to the planes of the sprockets at all times during shifting. This allows the jockey wheel 252 to follow the chain 18 (not shown) from sprocket to sprocket and take up any slack in the chain. The upper parallelogram linkage member 270 is hingedly coupled to the proximal end of the articulated arm 250 by a pin 276, and is hingedly coupled to the distal end of the articulated arm 50 by a pin 280. In one embodiment, the pins 276, 280 allow the linkage member 270 to pivot along a plane corresponding to the angle required to shift the chain 18 between sprockets. The length of the linkage member 270 is fixed according to the range of articulation required to properly position the jockey wheel 252 in place against a given sprocket.

The lower parallelogram linkage assembly 272 comprises a lower base arm 284 hingedly coupled to the distal end of the articulated arm 250 by means of a pivot pin 286. The lower extension arm 288 is hingedly coupled to the proximal end of the articulated arm 250 by way of a pivot pin 290. The pins 286, 290 allow the parallel linkage assembly 272 to rotate in a plane corresponding to the angle required to shift the chain between the sprockets. The lower base arm 284 includes an elongated slot 292 into which the lower extension arm 288 is inserted to enable the lower extension arm 288 to ride in the slot 292 and move relative to the lower base arm 284. This movement allows the lower parallelogram linkage 272 to be adjusted to an appropriate length, according to the vertical range of motion required. The length of the lower base arm 284 is moved relative to the lower extension arm 288 by an adjustment screw 293, as shown in FIG. 12.

A lever spring 294 is rotatably coupled to the pin 290 of the lower extension arm 288 in such a way that the lever spring 94 extends between the upper parallelogram linkage member 270 and the lower parallelogram linkage assembly 272. The purpose of the lever spring 294 is the same as described above with respect to the embodiment of FIG. 3.

The compensator mounting bracket 260 also includes a threaded setscrew 264 which passes completely through the mounting bracket 260. The purpose of setscrew 264 is to adjust the range of horizontal movement of the articulated arm 250. For example, when less articulation is desired, the setscrew 264 is turned to increase the distance it extends toward the apertures 263. Upon extreme articulation, a pocket 267 journaled into the proximal end of the articulated arm 250 engages the setscrew 264, which acts as a fence such that the jockey wheel 252 cannot drift out of the plane corresponding to the angle required to shift the chain 18 between the sprockets. The range of articulation may be set so as to not exceed the horizontal position of the inner sprocket 34 so the chain has less chance of becoming completely derailed from the sprocket assembly.

Another aspect of the present invention involves a stop piece 278 having a pair of mounting apertures 282 and being mounted to the proximal end of the articulated arm 250 through apertures 283. The stop 278 engages the upper parallelogram linkage member 270 to limit the upward range of motion of the articulated arm 250. The stop 278 thus also helps prevents the jockey wheel 252 from moving excessively in a vertical direction, which otherwise might cause the jockey wheel to pass vertically upwardly beyond the vertical location of the inner sprocket.

In combination, the setscrew 264 and the stop piece 278 set vertical and horizontal movement limits on the chain 18 so that the chain 18 remains constantly entrained around one of the sprockets. This prevents the chain from moving excessively in vertical direction, from skipping indiscriminately from one sprocket to another, and from becoming completely derailed.

The jockey wheel 252 includes an annular hollowed-out portion 255 located between the outermost periphery of the wheel 252 and the axis about which the wheel rotates. The hollowed-out portion 255 gives the wheel a shock-absorbing capability, which prevents the chain 18 from bouncing up and down relative to the wheel 50. The hollowed-out portion 255 tends to flex or "dish" when experiencing a shock which effectively absorbs the shock. On the opposite side, the jockey wheel includes a wide shoulder 257 which also helps maintain the chain 18 entrained on the teeth of the jockey wheel 52.

Figure 13:
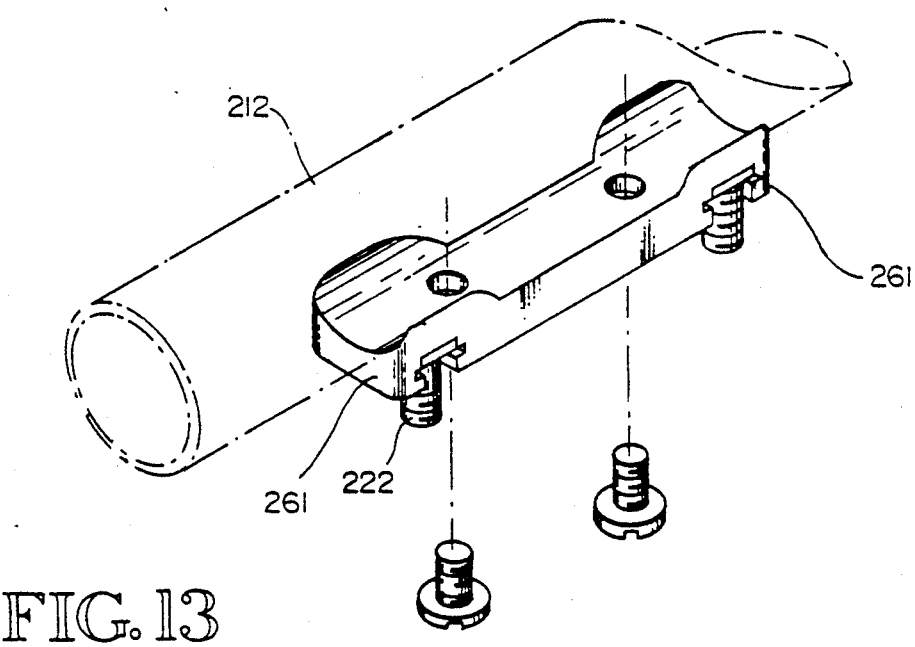
FIG. 13 is an alternative embodiment of the frame mounting bracket for securing the sliding bracket and the compensator mounting bracket to the bicycle frame.

FIG. 13 shows an alternative embodiment of a frame mounting bracket 261 having mounting screws 222 which correspond to the apertures 269 of the mounting bracket 260 (FIG. 12) for securing the mounting bracket 260 to the bicycle frame 12. The sliding bracket 48 (FIG. 4) is also secured to the frame 12 by the frame mounting bracket 261 such that the bracket 48 is sandwiched between the frame mounting bracket 261 and the bracket 260 on the mounting screws 222.

Figure 14:
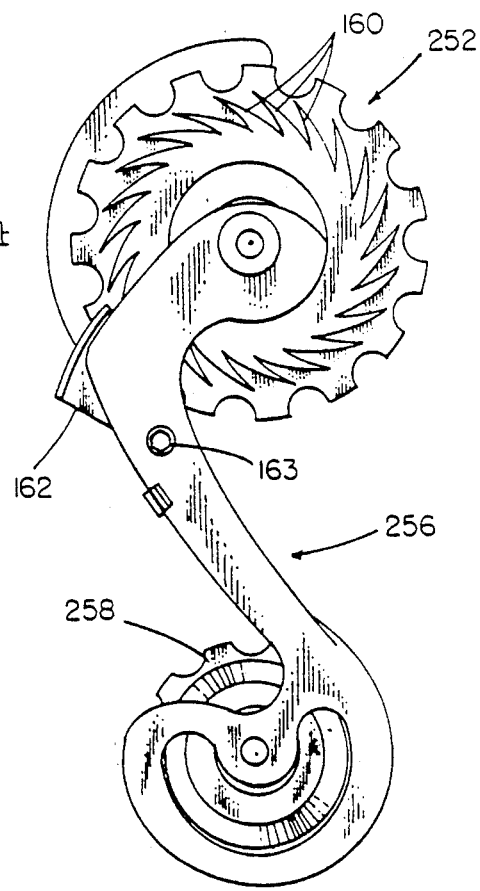
FIG. 14 is a side elevational view of an alternative embodiment of the tensioning arm.
Figure 15:
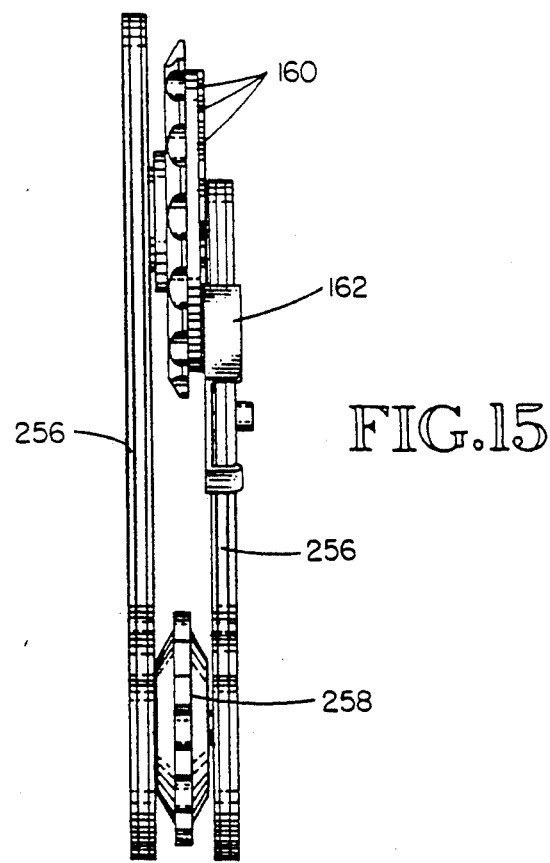
FIG. 15 is an end elevational view of the tensioning arm of FIG. 14.

FIGS. 14 and 15 show an alternative embodiment of the jockey wheel 252 and the tensioning arm 256. A plurality of helical ridges 160 are formed in one side of the jockey wheel 252. The ridges 160 are curved in such a way as to urge the chain 18 (not shown) back onto the jockey wheel 252 in the event the chain derails from the jockey wheel. A deflector guard 162 is coupled to the tensioning arm 256 at mounting point 163 and acts in combination with the ridges 160 to reentrain the chain in the event of derailment. Further, the guard 162 acts as a shield to prevent the chain from becoming wedged between the jockey wheel 252 and the arm 256, which might break the chain.

Referring now to FIGS. 16–21, another aspect of the invention includes a mounting bracket 172 for securing the front sprocket selector 166 to the bicycle frame 12. The front sprocket assembly 14 (FIG. 1) is secured to the bicycle frame 12 through pedal shaft 164. The front sprocket selector 166 must be coupled to the frame 12 to ensure that the pawl 170 (FIG. 21), traveling in a path 168, passes unimpededly through slot 168 of the sprocket selector 166 when no shifting takes place. This type of front sprocket selector is described in U.S. Pat. No. 4,894,046, which is incorporated by reference in its entirety into the present disclosure.

Figure 16:
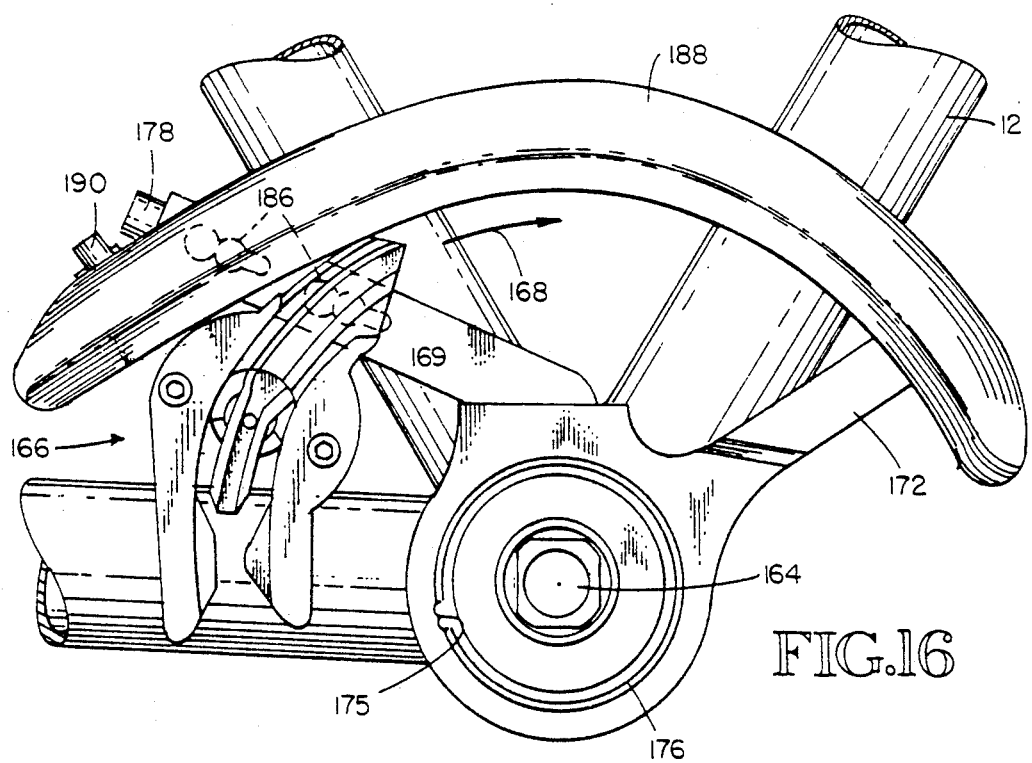
FIG. 16 is an enlarged, side elevational view of a sprocket selector for the front sprocket assembly and corresponding adjustment bracket.
Figure 17:
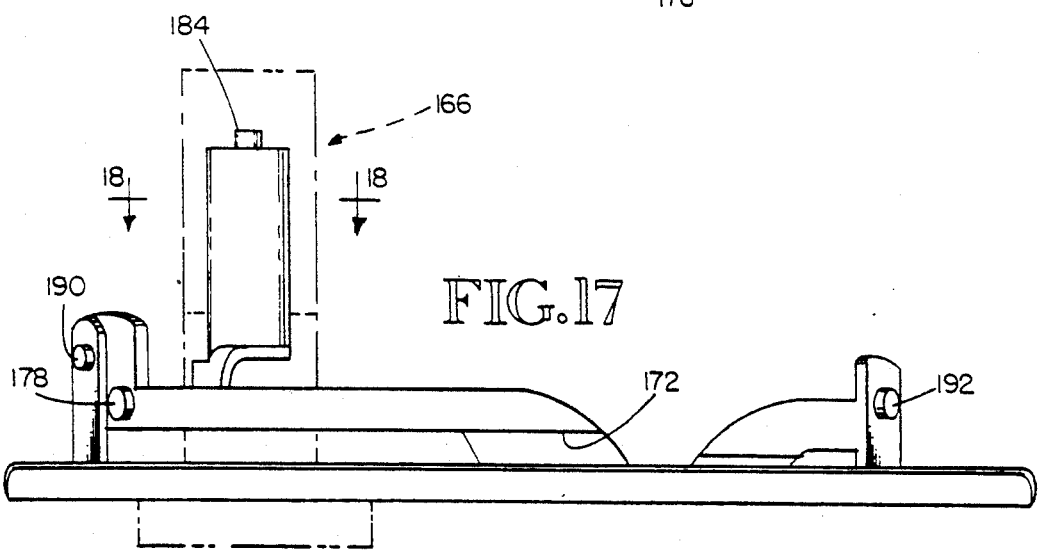
FIG. 17 is a top view of the front sprocket selector and adjustment bracket of FIG. 16.
Figure 18:
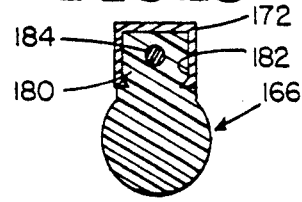
FIG. 18 is a sectional side elevation view, taken along the line 18—18 of FIG. 17, of the front sprocket selector and adjustment bracket.

Proper adjustments of the front sprocket selector 166 must be made in a radial direction, with respect to the pedal shaft axis 164, and in a transverse direction (in and out of the page as shown in FIG. 16). The radial orientation of the sprocket selector path 168 is primarily established by mounting the bracket 172 about the pedal shaft 164. A perpendicular protrusion piece 175 of the bracket 172 is inserted into a corresponding aperture in the pedal shaft housing 176 to ensure that the bracket 172 is properly oriented. Fine adjustments in the radial direction are made by a radial adjustment screw 178.

Figure 19:
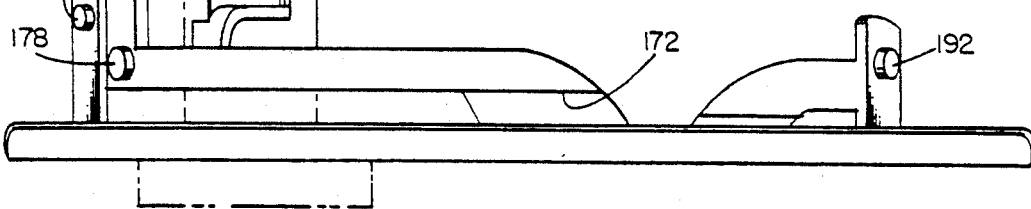
FIG. 19 is a partial rear elevational view of the front sprocket selector and adjustment bracket of FIG. 16.
Figure 20:
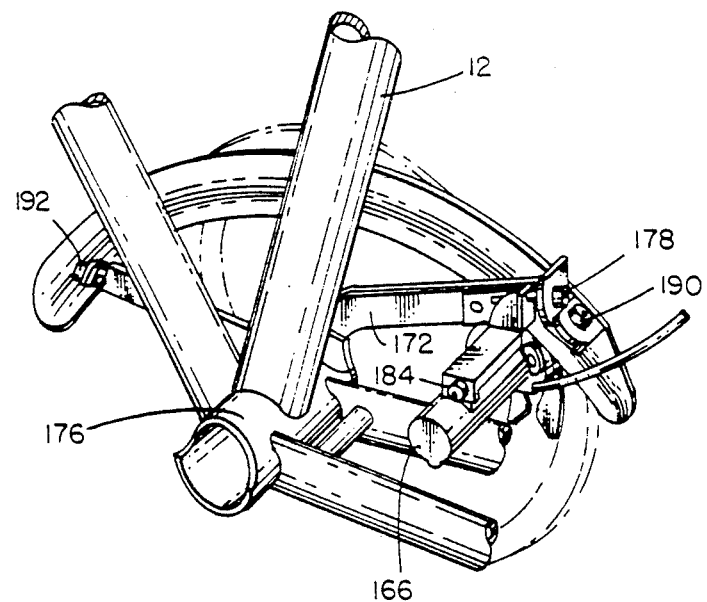
FIG. 20 is a rear isometric view of the sprocket selector and adjustment bracket of FIG. 16.
Figure 21:
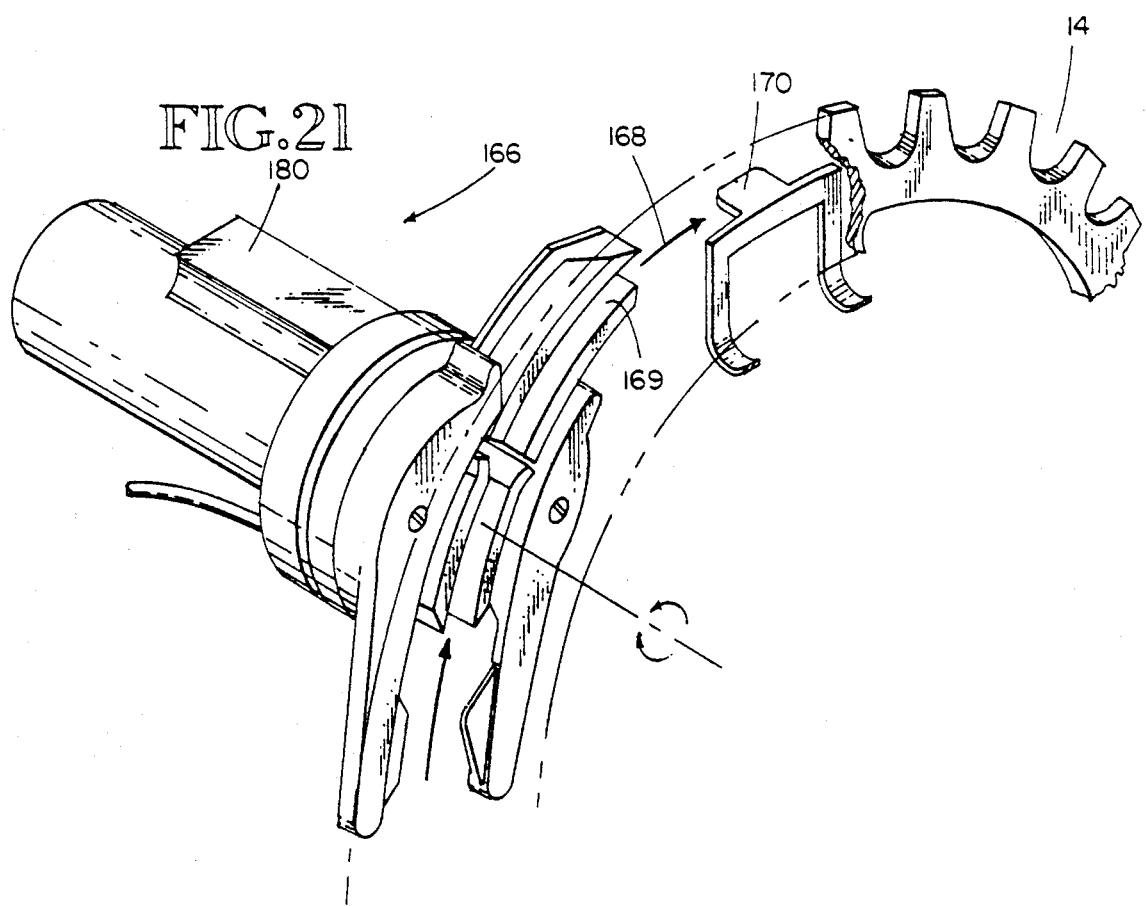
FIG. 21 is an isometric view, partly in section, of the front sprocket selector and front sprocket assembly of FIG. 14.

With respect to transverse adjustments, the selector 166 is coupled to the bracket 172 through a dove tail extension piece 180 which is inserted into a transverse channel 182 of the bracket 172 (see FIGS. 16 and 19). A transverse adjustment screw 184 is threadably received by the dovetail piece 180 which adjusts the position of the sprocket selector in the transverse direction.

A pair of attachment studs 186 (shown in hidden lines in FIG. 16) allow the sprocket selector 166 to be removably secured to the bicycle frame 12. Thus, the sprocket selector 166 can be removed and serviced without the need of removing the bracket 172 from the pedal shaft 164. A chain guard 188, which prevents the chain 18 from accidentally derailing to the inside, is mounted to the bracket 172 by screws 190, 192 and must normally be removed prior to removing the sprocket selector 166. A major benefit of the adjustment bracket 172 is that the front sprocket selector 166 can first be firmly secured to the frame 12; subsequently, the adjustments can be made to allow the pawl 170 to pass through the pawl path 168 without obstruction. This eliminates the need to preadjust the sprocket selector 166 before securing it to the frame and hence the burdensome trial-and-error guessing that would otherwise be required. The front sprocket selector bracket 172 thus provides a secure, reliable, efficient means for adjusting the front sprocket selector 166 to correspond to the path of pawl 170.

While the preferred embodiments of the present invention have been illustrated and described, it is to be understood that variations will be apparent to one of ordinary skill in the art without departing from the principles described herein. Accordingly, the invention is not to be limited to the specific embodiments illustrated in the drawings.

We claim:

1. A bicycle transmission, comprising:
   a front sprocket rotatably coupled to a bicycle frame;
   a rear sprocket assembly coupled to a bicycle wheel, the rear sprocket assembly having multiple sprockets of different diameters;
   a chain entrained around the front sprocket and a sprocket of the rear sprocket assembly;
   shifting means for shifting the chain between the sprockets; and
   a compensator having a proximal end and distal end, the proximal end being pivotally coupled to the bicycle frame, the distal end having an engagement means for engaging and holding the chain, the compensator including biasing means for urging the engagement means toward the sprocket such that engagement means forces the chain to be entrained around the sprocket, wherein the compensator functions independently of the shifting means and automatically follows the chain when shifted between sprockets.

2. A bicycle transmission according to claim 1 wherein the rear sprocket assembly comprises a stationary sector and a parting sector, the shifting means causing the parting sector to move relative to the stationary sector to shift the chain from one sprocket to another, the compensator freely following the chain from one said sprocket to another said sprocket to take up any slack in the chain caused by shifting.

3. A bicycle transmission according to claim 1 wherein the biasing means urges the engagement means toward the sprocket with sufficient force to eliminate any free chain between the engagement means and the sprocket.

4. A bicycle transmission according to claim 1, further comprising means for maintaining the jockey wheel substantially parallel to the planes of the sprockets regardless of which sprocket holds the chain.

5. A bicycle transmission according to claim 1 wherein the compensator comprises:
an articulated arm having a proximal end and a distal end, the proximal end being pivotally coupled to the bicycle frame;
a jockey wheel rotatably mounted to the distal end of the articulated arm for engaging and urging the chain into engagement with the sprocket;
a tensioning arm pivotally mounted to the distal end of the articulated arm;
a tensioning wheel rotatably coupled to the tensioning arm opposite the jockey wheel for maintaining tension in the chain and receiving the chain after the chain leaves the front sprocket; and
biasing means for biasing the jockey wheel toward the sprocket to urge the chain into engagement with the sprocket and for biasing the tensioning arm away from the articulated arm to constantly maintain tension in the chain.

6. A bicycle transmission according to claim 5 wherein the biasing means comprises a coil spring mounted in a spring housing coupled to the distal end of the articulated arm.

7. A bicycle transmission according to claim 5 wherein the articulated arm includes a means for maintaining the jockey wheel substantially parallel to the planes of the sprockets regardless of which sprocket holds the chain.

8. A bicycle transmission according to claim 5 wherein the articulated arm comprises a parallelogram linkage coupled to the bicycle frame by a vertical pin, the parallelogram linkage and the pin allowing the jockey wheel to follow the chain as the chain is shifted from one sprocket to another and to remain parallel to the planes of the sprockets.

9. A bicycle transmission according to claim 5 wherein the jockey wheel comprises means for reentraining the chain around the jockey wheel in the event the chain becomes derailed from the jockey wheel.

10. A bicycle transmission according to claim 5 wherein the jockey wheel comprises a plurality of helical grooves notched into one side and a shield, the helical grooves causing the chain to ride back onto the jockey wheel in the event the chain becomes derailed from the jockey wheel, the shield preventing the chain from becoming lodged between the jockey wheel and the tensioning arm.

11. A bicycle transmission according to claim 5 wherein the jockey wheel comprises means for absorbing shock experienced by the bicycle to prevent the jockey wheel and chain from bouncing up and down relative to the sprocket.

12. A bicycle transmission according to claim 11 wherein the means for absorbing shock comprises an annular groove formed in the periphery of the jockey wheel, the groove allowing the jockey wheel to compress upon experiencing shock from the bicycle and thus absorb the shock.

13. A bicycle transmission according to claim 1 further comprising means for restricting the movement of the articulated arm in the vertical direction to prevent the chain from becoming derailed from the sprocket assembly.

14. A bicycle transmission according to claim 13 wherein the means for restricting vertical movement comprises a stop piece coupled to the proximal end of the articulated arm for engaging the articulated arm and preventing movement of the articulated arm beyond a predetermined vertical distance.

15. A bicycle according to claim 14 further comprising means for limiting the horizontal movement of the articulated arm to prevent the chain from becoming derailed from the sprocket assembly.

16. A bicycle transmission according to claim 15 wherein the means for limiting horizontal movement comprises a setscrew secured to a compensator mounting bracket, the articulated arm engaging the setscrew to prevent the articulated arm from moving horizontally beyond a predetermined position.

* * * * *